United States Patent [19]
Cho

[11] Patent Number: 5,937,039
[45] Date of Patent: Aug. 10, 1999

[54] METHOD FOR SENDING OUT ABSENT MESSAGES FROM ISDN EXCHANGE SYSTEM

[75] Inventor: Seung-Hwan Cho, Seoul, Rep. of Korea

[73] Assignee: SamSung Electronics Co., Ltd., Kyungki-do, Rep. of Korea

[21] Appl. No.: 08/829,384

[22] Filed: Mar. 31, 1997

[30] Foreign Application Priority Data

Mar. 30, 1996 [KR] Rep. of Korea ................. 96/9618

[51] Int. Cl.⁶ ..................................... H04M 1/57
[52] U.S. Cl. .................. 379/93.17; 379/257; 379/350
[58] Field of Search ................ 379/93.01, 93.17, 379/93.23, 201, 207, 210, 213, 229, 242, 243, 245, 247, 257, 350, 352, 354, 387, 396

[56] References Cited

U.S. PATENT DOCUMENTS

| | | | |
|---|---|---|---|
| 4,794,639 | 12/1988 | Urui et al. ............................. | 379/89 |
| 4,899,358 | 2/1990 | Blakley .................................. | 379/67 |
| 4,922,490 | 5/1990 | Blakley ................................ | 370/110.1 |
| 4,969,182 | 11/1990 | Ohtsubo et al. ...................... | 379/67 |
| 5,001,709 | 3/1991 | Satoh ................................. | 370/110.1 |
| 5,119,415 | 6/1992 | Aoyama ............................... | 379/207 |
| 5,138,655 | 8/1992 | Takashima et al. ................... | 379/157 |
| 5,278,896 | 1/1994 | Sakata et al. ......................... | 379/70 |
| 5,305,097 | 4/1994 | Sato et al. ............................. | 348/14 |
| 5,305,313 | 4/1994 | Katoh .................................. | 370/62 |
| 5,309,511 | 5/1994 | Kotake ................................. | 379/201 |
| 5,351,235 | 9/1994 | Lahtinen ............................. | 370/58.1 |
| 5,436,963 | 7/1995 | Fitzpatrick et al. .................. | 379/212 |
| 5,467,389 | 11/1995 | Endo et al. ........................... | 379/201 |
| 5,497,413 | 3/1996 | Nakano ................................ | 379/89 |
| 5,533,104 | 7/1996 | Weiss et al. .......................... | 379/70 |
| 5,557,666 | 9/1996 | Kim ..................................... | 379/201 |
| 5,608,788 | 3/1997 | Demlow et al. ...................... | 379/142 |
| 5,703,936 | 12/1997 | Tsuchida et al. ..................... | 379/88 |

*Primary Examiner*—Scott Weaver
*Attorney, Agent, or Firm*—Robert E. Bushnell, Esq.

[57] ABSTRACT

A method for sending out absent messages in an ISDN exchange system to which digital telephones with a plurality of function keys and a LCD screen are connected as extension subscribers. When an extension subscriber of an ISDN exchange system is called up, the ISDN exchange system checks whether the called up extension subscriber's telephone is set in an absent message sending mode, and if any, transmits stored absent message to the caller so as to display on LCD screen of the caller's digital telephone. The ISDN exchange system includes a memory for storing a plurality of absent messages representing different absent reasons depending on the subscriber's various situations. A telephone subscriber can choose in advance a proper one of the plurality of absent messages representing his absent reason before outgoing. Accordingly, when the user's digital telephone is called up, the ISDN exchange system retrieves the chosen absent message from the memory transmitted to be displayed on the LCD screen of the caller's digital telephone.

20 Claims, 7 Drawing Sheets

METHOD FOR SENDING OUT ABSENT MESSAGES FROM ISDN EXCHANGE SYSTEM

CLAIM FOR PRIORITY

This application makes reference to, incorporates the same herein, and claims all benefits accruing under 35 U.S.C. §119 from an application for Method For Sending Out Absence Messages From ISDN Exchange System earlier filed in the Korean Industrial Property Office on Mar. 30, 1996, and there duly assigned Ser. No. 9618/1996.

BACKGROUND OF THE INVENTION

Technical Field

The present invention relates to a method for automatically sending a called subscriber's absent message to a caller's digital telephone, more particularly, relates to a method for sending out a called subscriber's absent message and displaying the same on the caller's digital telephone by means of an integrated services digital network (ISDN) exchange system.

Related Art

Generally, when a called subscriber is absent, an incoming telephone call from a caller will not be answered by the called subscriber. Hence, in case the called subscriber is absent for a long time period, the caller may vainly repeat telephone calls without knowing the reason of the called subscriber's absence, which may cause lots of inconveniences to the called subscriber particularly in case of emergency. Accordingly, the so-called "automatic response" or "automatic answering" function is implemented to furnish the subscribers with better services. Such a function is generally implemented in conventional telephone systems as disclosed, for example, in U.S. Pat. No. 5,278,896 for Automatic Answering Telephone Apparatus issued to Sakata et al., U.S. Pat. No. 5,436,963 for Telephone Answering Method And Apparatus issued to Fitzpatrick et al., and U.S. Pat. No. 5,533,104 for Telephone Answering Device And Method issued to Weiss et al. A pre-recorded message is played back in response to an incoming telephone call to inform the caller of the reason of the called subscriber's absence and request the caller to call again at a proper time.

Generally, a recorded message informing of the called subscriber's absence is sent out in a voice format. If the telephone system is a digital telephone set or a key phone system that has a plurality of function keys and a liquid crystal display (LCD) screen like digital telephone sets, the absent message from the called subscriber may be displayed on the LCD of the caller's digital telephone system. One example of such digital telephone system is described in the Korean Patent Publication No. 92-1001 for Electronic Handy Exchange System And Method For Sending Receiver's Absent Message In Private Exchange System which was applied on Dec. 31, 1988 by the same Applicant and was subsequently laid open on Feb. 1, 1992. In such a digital telephone system, when one subscriber in a private exchange system calls an another subscriber who is absent from his or her digital telephone, the absent message is displayed on a LCD screen of the calling subscriber's digital telephone set in order to inform the calling subscriber the reason why the called subscriber is absent. Such a telephone system is, however, limited to operation within a private exchange system, absent messages of extension telephone subscribers cannot be delivered to public telephone exchange subscribers and vice versa because the exchange system as earlier described in Patent No. 92-1001 accommodates only analog trunk lines.

In recent years, however, integrated services digital network (ISDN) exchange systems have begun to replace analog exchange systems to provide services of voice, video, and data communications. ISDN exchange systems can be compatible with existing public telephone exchange systems through both analog trunk line and digital trunk line. Contemporary ISDN exchange systems for supporting digital telephones are available with call announcement arrangement to alert a called subscriber of an incoming call as disclosed, for example, in U.S. Pat. No. 4,899,358 for Call Announcement Arrangement issued to Blakley, and U.S. Pat. No. 4,922,490 for Telephone Station Set issued to Blakley. Other ISDN exchange systems such as disclosed in U.S. Pat. No. 5,001,709 for Communication System And Apparatus issued to Satoh, and U.S. Pat. No. 5,305,097 for Communication Apparatus Having Calling Party Number Display Device issued to Sato et al., allow the user to see the calling subscriber's telephone number on his or her digital telephone in order to facilitate decision to answer an incoming call.

Recent ISDN exchange systems are also equipped with various automatic answering function such as disclosed in U.S. Pat. No. 5,351,235 for Method For Relaying Information In An Integrated Services Network issued to Lahtinen, U.S. Pat. No. 5,497,413 for Telephone System With Message Recording Function issued to Nakano, and U.S. Pat. No. 5,608,788 for Information Display Provided To Calling Party issued to Demlow et al. In Lahtinen '235, for example, a short message service technology for new public land mobile phone systems such as GSM network is implemented to facilitate communication between mobile phone users. In Nakano '413, a voice mail recorder is included in a digital telephone to record a voice message received from a calling party during absence of a called party and to vocally reproduce the recorded message in response to a request from called party. In Demlow '788, by contrast, a commercial information display arrangement is provided to serve a calling customer with information data supplied from a central office to be displayed on the calling telephone. Information data may be in a form of name of called customer, slogan, advertising, cost message from the called customer, and invitation to leave a voice message. While these ISDN exchange systems contain a variety of automatic answering functions, I have found that an effective and personalized automatic telephone answering arrangement for ISDN exchange systems can be contemplated.

SUMMARY OF THE INVENTION

Accordingly, it is therefore an object of the present invention to provide a method for sending out a called party's absent message to be displayed on a calling party's digital telephone through an ISDN exchange system.

It is also an object to provide a method for sending a called subscriber's absent message from a called subscriber's digital telephone in an ISDN exchange system to a public telephone exchange subscriber when the public telephone exchange subscriber calls the called subscriber who is absent.

It is further another object to provide a method for sending a subscriber's absent message of an ISDN exchange system to another ISDN exchange system subscriber connected to a public telephone exchange system when the latter calls the former who is absent.

In accordance with one aspect of the present invention, a method for sending out absent messages in an ISDN exchange system to which digital telephones each having a plurality of function keys and a LCD screen is connected as extensions, which includes the steps of: checking whether an extension subscriber telephone is set in an absent message sending mode in response to an incoming call from a caller through said ISDN exchange system; and transmitting a stored absent message to be displayed on the LCD screen of the caller's digital telephone, when the extension subscriber telephone is set in the absent message sending mode. The ISDN exchange system includes a memory storing a plurality of absent messages representing different absent reasons depending on extension subscribers' various situations. Thus, an extension subscriber can designate in advance an absent message among absent messages stored in memory before outgoing. If a digital telephone set in the absent message sending mode with a selected absent message is called up, the ISDN exchange system retrieves the selected absent message from memory and transmits the retrieved absent message for display on the LCD screen of the caller's digital telephone set. At this time, if the caller is an public telephone exchange subscriber, the retrieved absent message is sent through D-channel of a digital trunk line. The public telephone exchange system then displays an absent message transmitted through D-channel of the digital trunk line on the LCD screen of the caller's digital telephone. If the caller is an extension telephone subscriber, however, ISDN exchange system sends out the retrieved absent message through extension line for display on the LCD screen of the caller's digital telephone.

In accordance with a second aspect of the present invention, if an extension subscriber of an ISDN exchange system calls an absent extension subscriber of another ISDN exchange system, the called-up party's absent message is displayed on LCD screen of the caller's digital telephone. The ISDN exchange systems are each connected to respective public telephone exchange systems through digital trunk lines, and include their own extensions connected to digital telephones with a plurality of function keys and a LCD screen. Further, each ISDN exchange system has a memory storing a plurality of absent messages. For example, when a first extension subscriber of the first ISDN exchange system is called up by a second extension subscriber of the second ISDN exchange system, the first ISDN exchange system checks whether the first extension subscriber is set to the absent message sending mode. At this time, if the first extension subscriber is set to the absent message sending mode, the first ISDN exchange system retrieves an absent message selected by the first extension subscriber from the memory. The absent message is designated by the first extension subscriber in order to inform any calling parties of his absent reason before outgoing. And when the first ISDN exchange system sends out the retrieved absent message through D-channel of digital trunk line to a public telephone exchange system, the public telephone exchange system further sends out the relayed absent message through D-channel of digital trunk line to the second ISDN exchange system for display the relayed absent message on LCD screen of the caller's digital telephone, i.e. the second extension subscriber, thereby informing the caller of the called-up party's absent reason. As a result, when a called party is called after presetting his digital telephone to the absent message sending mode by designating an absent message before outgoing, the caller can be informed of the reason of the called party's absence.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
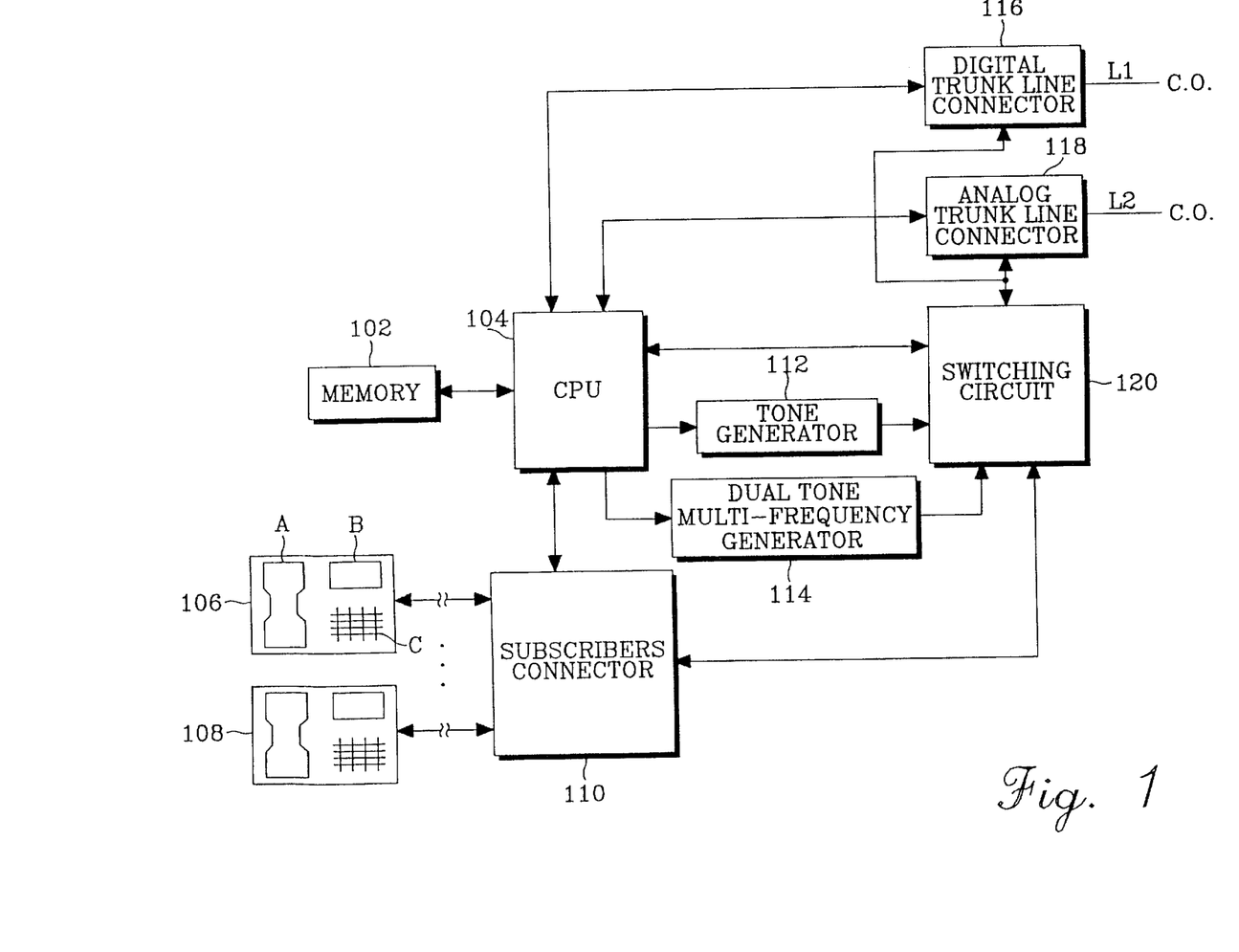
FIG. 1 is a block diagram of an ISDN exchange system having automatic answering function according to the principles of the present invention.

Referring now to the drawings and particularly to FIG. 1, which illustrates an ISDN exchange system having automatic answering function according to the principles of the present invention. The ISDN exchange system includes a memory 102, a central processing unit (CPU) 104, digital telephones 106, 108, a subscriber connector 110, a tone generator 112, a dual tone multi-frequency (DTMF) generator 114, a digital trunk line connector 116 connected to digital trunk line L1 of a central office C.O, an analog trunk line connector 118 connected to analog trunk line L2 of a central office C.O., and a switching circuit 120.

As shown in FIG. 1, the CPU 104 receives signaling data from the digital telephones 106, 108 or applies signaling data to the digital telephones 106, 108. Each digital telephones 106, 108 consists of a handset A, a liquid crystal display (LCD) screen B and a plurality of function keys C respectively and form extension subscribers of the ISDN exchange system. The memory stores necessary programs as well as processing data for various operations of the ISDN exchange system under control of the CPU 104. In addition, the memory 102 also stores a plurality of different absent messages for performing the absent message sending mode according to the present invention. Such absent messages represent different absent reasons depending on subscribers' various situations. The subscriber connector 110 applies signaling data from the CPU 104 to a corresponding digital telephone, and supplies signaling data from a digital telephone to the CPU 104. The switching circuit 120 forms communication channels between extension subscribers themselves and between extension subscribers and public telephone exchange subscribers under control of the CPU 104. The tone generator 112 applies tone signals to communication channel formed by switching circuit 120 under control of the CPU 104. The CPU 104, in turn, retrieves dial digits from memory 102 to the DTMF generator 114 for generation of corresponding dual tone multi-frequency. Digital trunk line connector 116 interfaces digital trunk line L1 with switching circuit 120, and analog trunk line connector 118 interfaces analog trunk line L2 with switching circuit 120. The above digital trunk line L1 and analog trunk line L2 are connected to public telephone exchange system.

In FIG. 1, except for the digital trunk line connector 116, the remaining constituent elements form together the usual analog exchange system. That is, the usual analog exchange system consists of a memory 102, a CPU 104, digital telephones 106, 108, a subscriber connector 110, a tone generator 112, a DTMF generator 114, a switching circuit 120 and an analog trunk line connector 118. The exchange system used for the inventive method of the present invention is an ISDN exchange system comprising such an analog exchange system provided with an additional digital trunk line connector 116.

The digital trunk line connector 116 as characteristic element of the ISDN exchange system can be embodied by BRI (Basic Rate Interface) or PRI (Primary Rate Interface). BRI consists of two B-channels and a D-channel, which is represented by 2B+D. PRI consists of thirty (30) B-channels and a D-channel, which is represented by 30B+D. In the foregoing, the 2B channels mean that two channels carry voice or data, and 30B channels mean that 30 channels carry voice or data. And D channel carries signaling messages exchanged between public telephone exchange system and ISDN exchange system.

The ISDN exchange system as shown in FIG. 1 of the present invention informs the caller of the called party's absence. Particularly, The ISDN exchange system used for the inventive method of the present invention is characterized in that when a public telephone exchange system subscriber calls an absent extension subscriber of ISDN exchange system, the ISDN exchange system sends the called party's absent message to the caller, i.e. the public telephone exchange system subscriber, which is distinguished from the conventional ISDN exchange system. The inventive method of the present invention comprises three steps including registering and predesignating absent messages of a would be called party, changing a registered absent message depending on situations, and sending out a predesignated absent message to the caller.

Figure 2A:
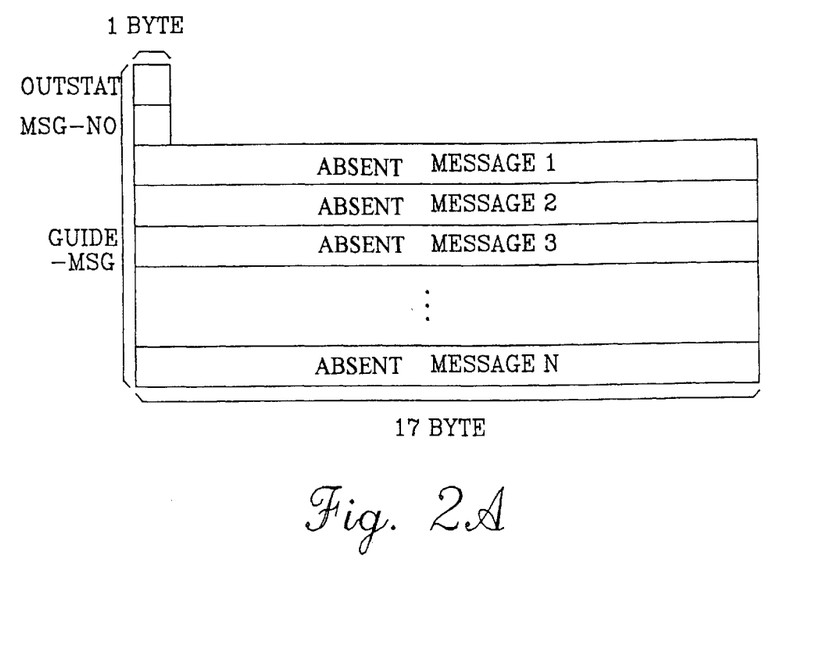
FIGS. 2A and 2B are structures of a memory illustrating examples of a registration table and registered absent messages stored therein according to the principles of the present invention.
Figure 2B:
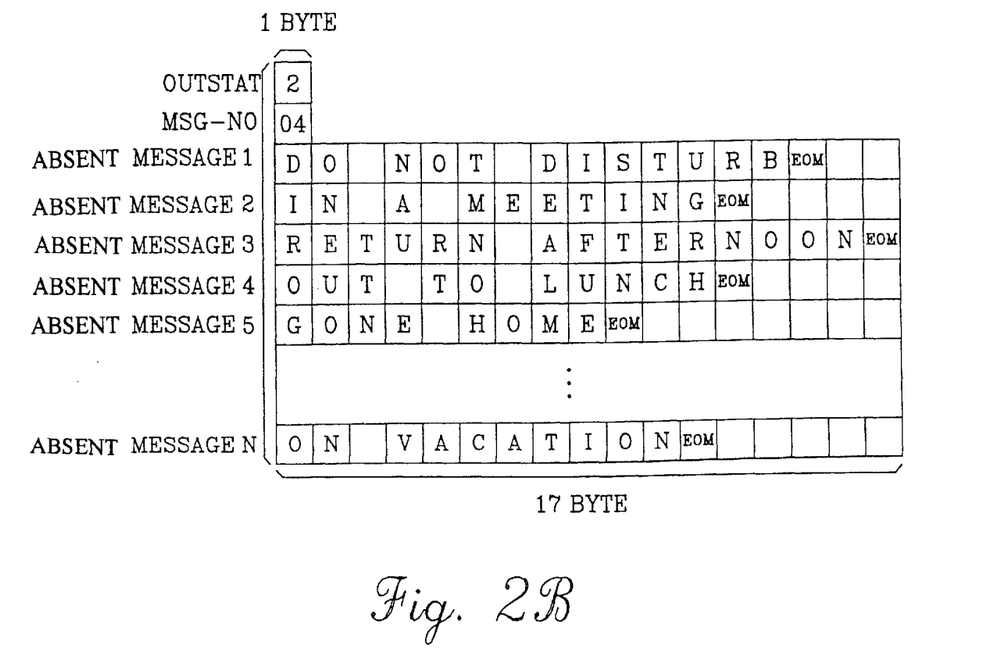

FIG. 2A illustrates the structure of memory 102 having a registration table, and FIG. 2B illustrates an example of registered absent messages. The absent message registration table consists of a OUTSTAT region of 1 byte, a MSG-NO region of 1 byte, and an absent MSG region. The OUTSTAT region stores a value representing whether the specific digital telephone is set in an absent message sending mode or not. Thus, the subscriber's absence or presence can be detected by identifying the value stored in OUTSTAT region. For example, if the value of OUTSTAT region is identified as "2", this means that the corresponding digital telephone is set to the absent message sending mode, which indicates the called party's absence. The MSG-NO region stores a message number indicating the reason of the subscriber's absence when the absent message sending mode is set. The GUIDE-MSG(ABSENCE- MSG) region stores a plurality of absent messages representing different absent reasons depending on subscribers' various situations, and the data length and numbers of messages to be stored in GUIDE-MSG region can be determined depending on types of LCD screen mounted on the digital telephones 106, 108 and on characteristics of an ISDN exchange system. Accordingly, the present invention will be described assuming that the LCD has 16-column display screen and correspondingly, the data length of each absent message is limited to 16 characters. And each absent message stored in GUIDE-MSG region is provided additionally at the message end an indication letter of 1 byte meaning "EOM (end of message)"

Figure 3:
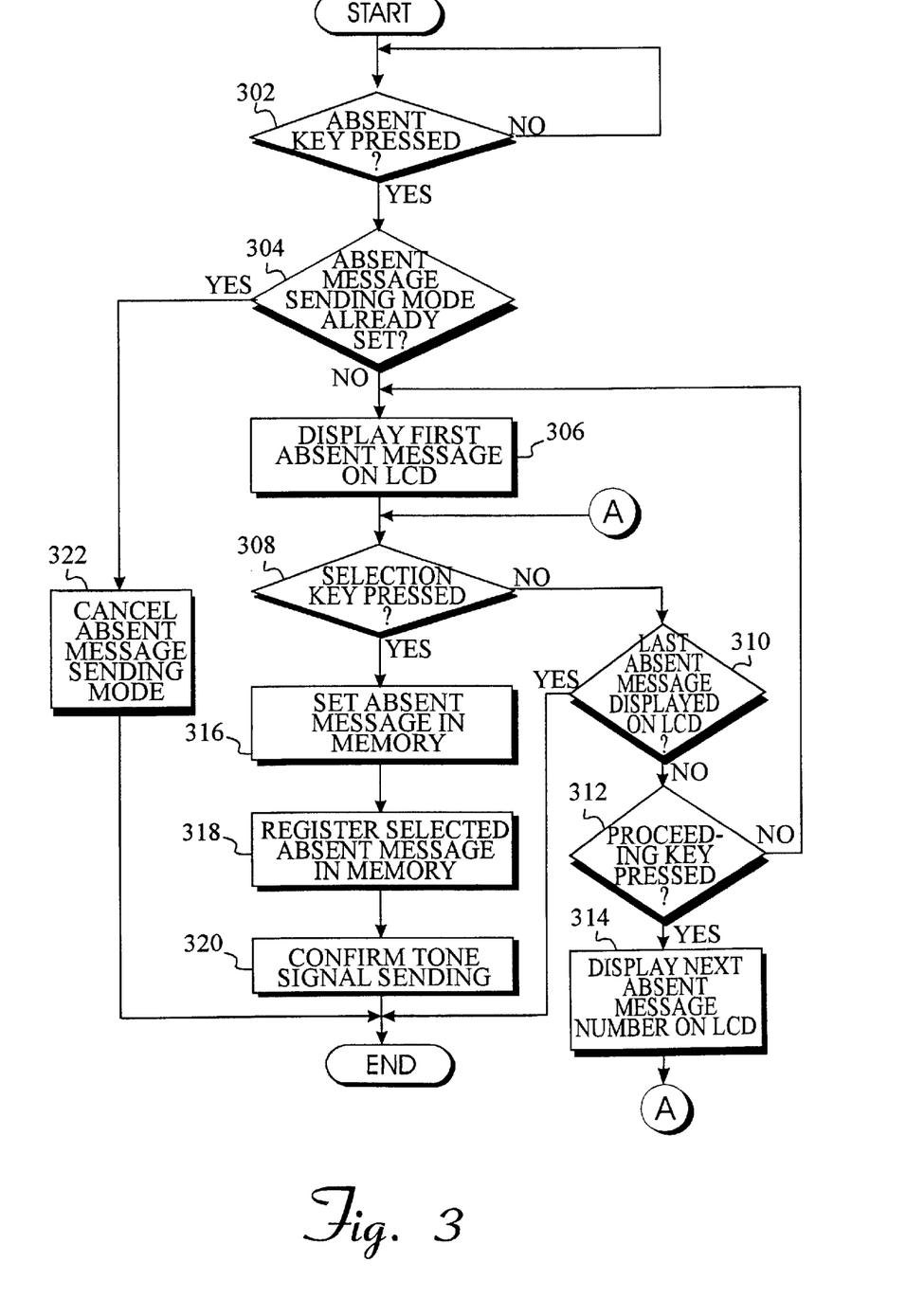
FIG. 3 is a flow chart illustrating an operating procedure for setting and canceling an absent message sending mode according to the present invention.

Now referring to FIG. 3, which illustrates an operating procedure for setting and canceling an absent message sending mode according to the present invention. When a subscriber of digital telephone 106 as shown in FIG. 1 is leaving office for lunch, he or she activates a key (hereinafter referred to as "absent key") among the function keys for setting the digital telephone in an absent message sending mode. Upon activation of an absent key at step 302, the CPU 104 checks whether an absent message sending mode is already set at step 304. At this time, if the absent message sending mode is already set, the CPU 104 proceeds to step 322 to cancel the absent message sending mode, which means that the subscriber presses the absent key again after returning from the outdoors.

If the absent message sending mode is not set, however, the CPU 104 proceeds to step 306 to retrieve absent message No. 1 stored in a form as shown in FIG. 2B in memory 102, and displays the same absent message on LCD screen. Thus, the subscriber can confirm the first absent message. If the first message number does not correspond to the intended reason for absence, the subscriber may actuate a key for displaying next message number (hereinafter referred to as "proceed key"), whereby CPU 104 proceeds through steps 310 to 314 to retrieve the next message number (absent message No. 2) from memory 102 and display the same on LCD screen. The above procedure continues until subscriber chooses proper message number corresponding to his absent reason.

When the proper absent message (for example, absent message No. 4) is displayed on the LCD, the subscriber presses down the selection key for setting the absent message, and the CPU 104 confirms the message setting at step 308 and stores the value "2" in OUTSTAT region of memory 102 at step 316 to complete the setting digital telephone 106 to the absent message sending mode. Thereafter, the CPU 104 registers the selected absent message number "04" in MSG-NO region of memory 102, which corresponds to the absent reason "OUT TO LUNCH" at step 318. After registration, the CPU 104 generates a tone signal by means of tone generator 112 to confirm the setting of the absent message sending mode and the registration of the proper absent message corresponding to the reason of the subscriber's absence at step 320.

When the digital telephone 106 is called-up, after the digital telephone 106 is set in the absent message sending mode according to the procedure as shown in FIG. 3, the registered absent message is sent to the caller. The operating procedure of sending the absent message to the caller is proceeded as shown in FIG. 4.

Figure 4:
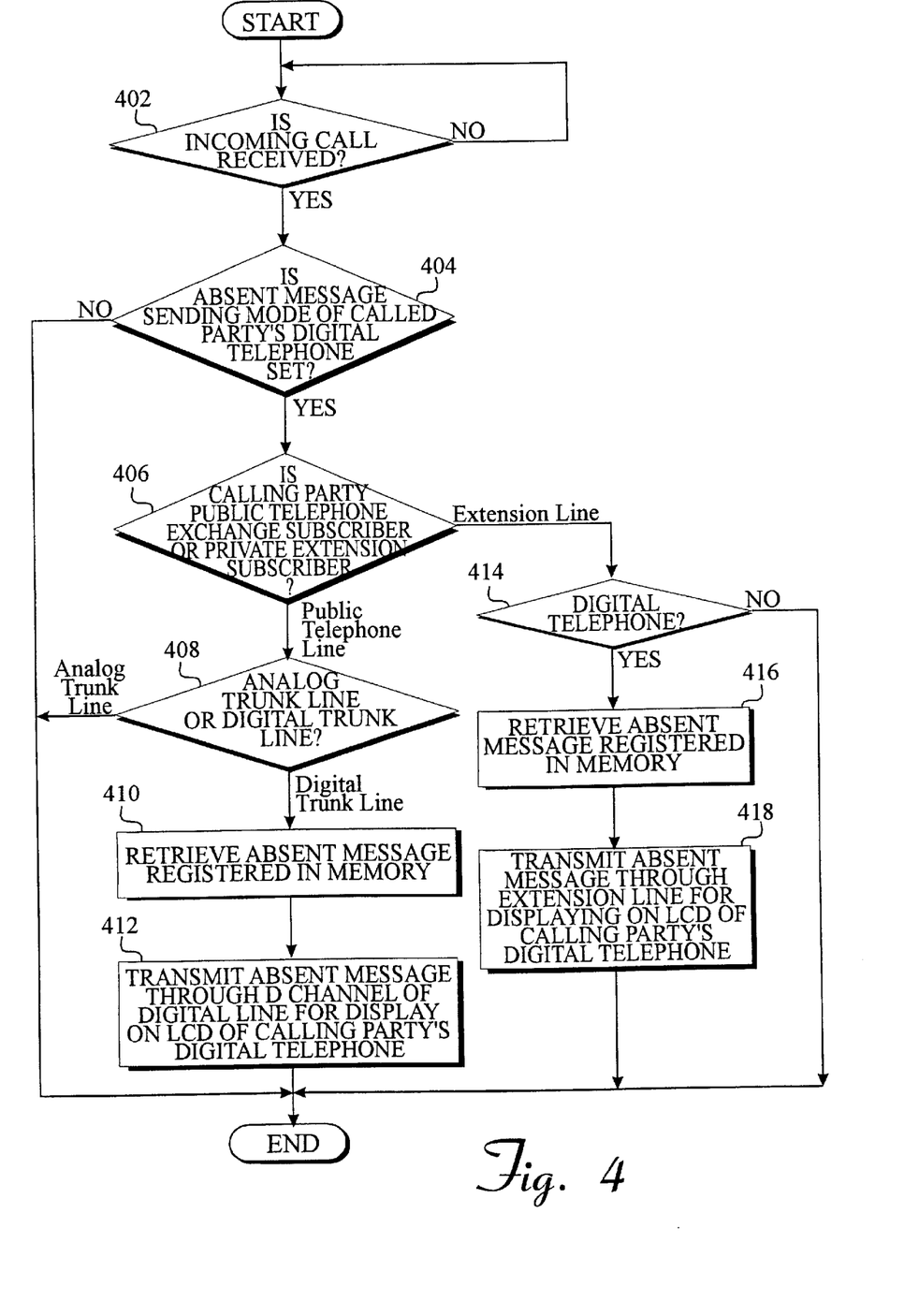
FIG. 4 is a flow chart illustrating an operating procedure of an absent message sending mode according to the present invention.

Referring to FIG. 4, when the digital telephone 106 receives an incoming call, the CPU 104 confirms the incoming call at step 402 and checks whether the digital telephone 106 is set in an absent message sending mode at step 404.

If the digital telephone 106 is in fact set in the absent message sending mode, the CPU 104 proceeds to step 406 and checks whether the caller is a public telephone exchange subscriber or a private extension subscriber. At this time, the CPU 104 performs step 408 to step 412 if the caller is a public telephone exchange subscriber, and performs step 414 to step 418 if the caller is a private extension subscriber.

When the caller is a public telephone exchange subscriber, CPU 104 also checks whether the caller is an analog or a digital trunk line subscriber at step 408. At this time, in case of analog trunk line, the CPU 104 terminates its operation because the transmission of the absent message is impossible. In case of digital trunk line, however, the CPU 104 proceeds to step 410 to retrieve the registered absent message from memory 102, and further proceeds to step 412 so as to send out the retrieved absent message through D channel of digital trunk line L1. The absent message sent out as above mentioned is displayed on the LCD screen of a digital telephone connected to a public telephone exchange system or connected through a ISDN exchange system to a public telephone exchange system. Consequently, the caller, a subscriber of a public telephone exchange system, can be informed of the called-up party's absent reason by means of the received absent message displayed on LCD screen of his digital telephone.

If the caller is an extension subscriber, the CPU 104 checks whether the caller's telephone is a digital telephone at step 414. At this time, if the caller's telephone is not a digital telephone, the CPU 104 terminates the operation procedure because it is not necessary to send out the absent message. If the caller's telephone is a digital telephone, however, the CPU 104 retrieves the registered absent message from memory 102 at step 416 and proceeds to step 418 to transmit the retrieved absent message for display on LCD screen of the caller's digital telephone. Consequently, an extension subscriber calling another extension subscriber's digital telephone of ISDN exchange system 106 can be informed of the called-up subscriber's absent reason by means of the absent message displayed on LCD screen of his own digital telephone.

Thus, the would be called-up party sets his or her digital telephone in advance to the absent message sending mode, thereby designating a proper absent message corresponding to his absent reason before leaving an installation, and thereafter, when receiving calling signal, the absent message is automatically sent out so as to be displayed on LCD screen of the caller's digital telephone.

Figure 5:
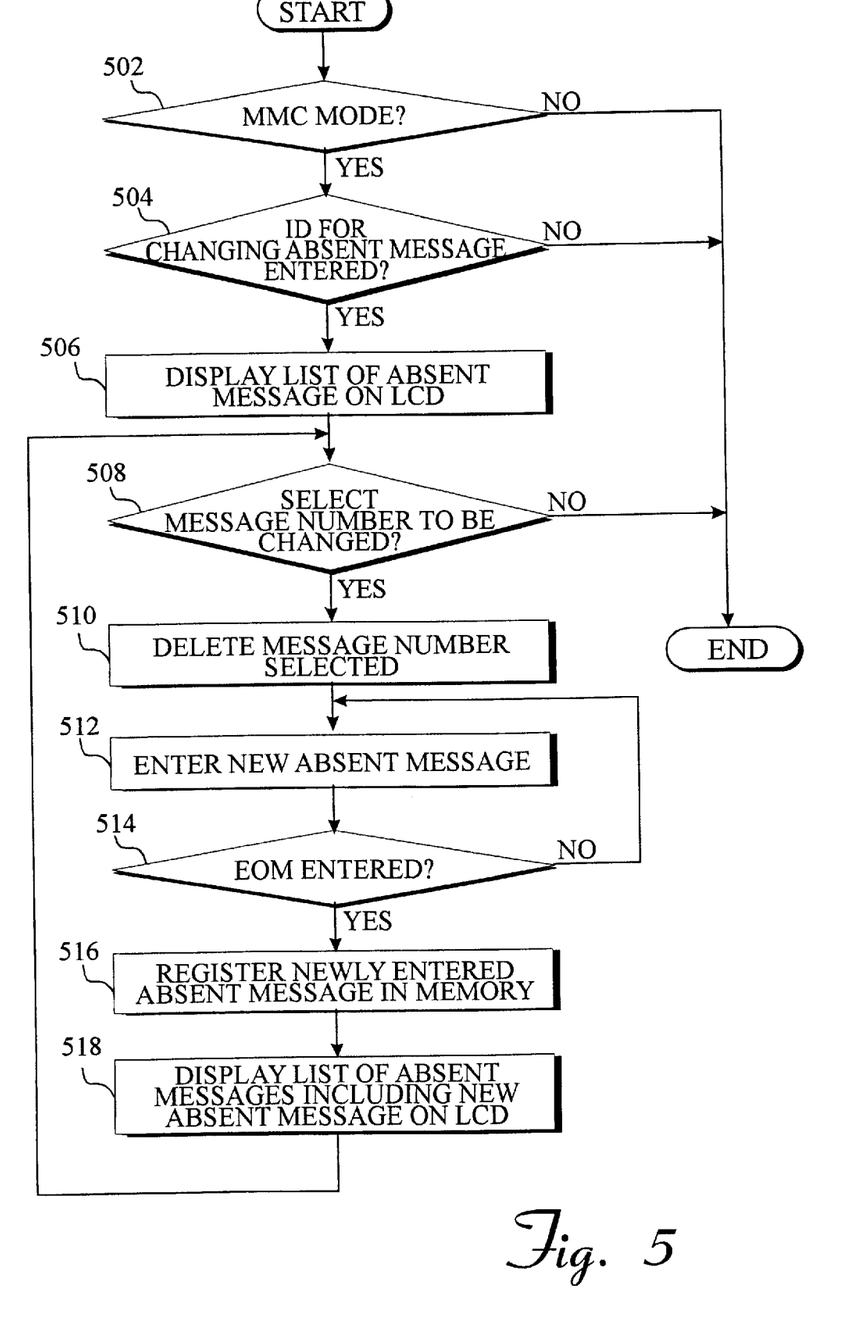
FIG. 5 is a flow chart illustrating an operating procedure for changing absent messages according to the present invention.

FIG. 5 illustrates an operating procedure for changing absent messages according to the present invention. The absent message changing procedure is performed under a man machine communication (MMC) mode of the ISDN exchange system. When the controller of a ISDN exchange system enters an identification (ID) for changing registered absent messages under the MMC mode, the CPU 104 confirms MMC mode of ISDN exchange system at step 502, and proceeds to step 504, thereby confirming the entry of the ID for changing absent massages. When confirming MMC mode and entry of ID for changing absent messages, the CPU 104 displays absent messages lists stored in memory 102 at step 506. And then, if the exchange system controller chooses a specific message number desired to be changed among the displayed messages lists, CPU 104 confirms the selection at step 508 and proceeds to step 510 to delete the absent message of selected number. At this time, if the exchange system controller enters new absent message, CPU 104 proceeds with the entry of new absent message in Step 512 until the entry of "EOM" representing the end of new absent message is confirmed in Step 514. After all the new absent messages are entered, the CPU 104 registers all newly entered messages in memory 102 at step 516 and proceeds to step 518 to display the absent messages lists, which contains the newly entered absent messages.

Accordingly, whenever the exchange system controller chooses any message number of absent messages desired to be changed, the CPU 104 repeats steps from 508 to 518 so as to change the selected absent messages. However, if the exchange system controller does not choose any message number to be changed while the messages lists are displayed, the CPU 104 terminates the message changing operation.

Figure 6:
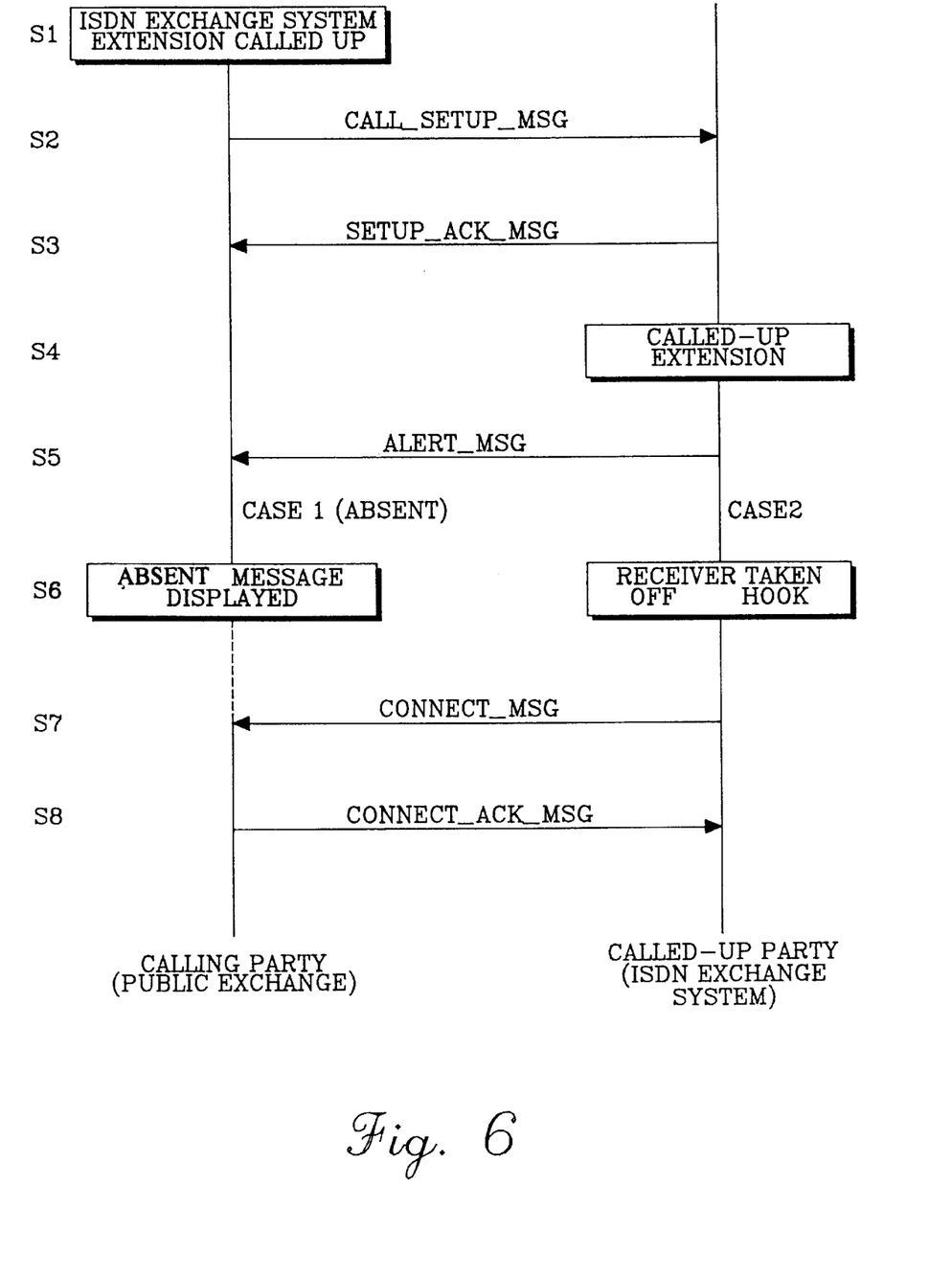
FIG. 6 is a chart sequentially illustrating a signaling message exchange between a calling party who is a public telephone exchange system subscriber and a called party who is an ISDN exchange system subscriber when an absent message sending mode is activated according to the principles of the present invention.

Referring to FIG. 6, when a public telephone exchange subscriber calls an extension subscriber of a ISDN exchange system at step S1, the above public telephone exchange system transmits a call setup message (CALL_SETUP_MSG) to the ISDN exchange system, i.e. the called-up party at step S2. The CALL_SETUP_MSG is a message for setting up a telephone line, which is generally used for telephone calls. When receiving the CALL_SETUP_MSG, the ISDN exchange system sends a setup acknowledging message (SETUP_ACK_MSG) to the public telephone exchange system at step S3. Further, the ISDN exchange system sends ring signals to the called-up extension subscriber at step S4. And then, the ISDN exchange system transmits an alert message (ALERT_MSG) through D channel of digital line to the public telephone exchange system at step S5 to advise the caller that the extension subscriber, i.e. the called party is being signaled. The above alert message is organized in the form as shown in FIGS. 7A and 7B, At this time, when the called-up extension line is set to the absent message sending mode, the alert message also contains an absent message.

Figure 7A:
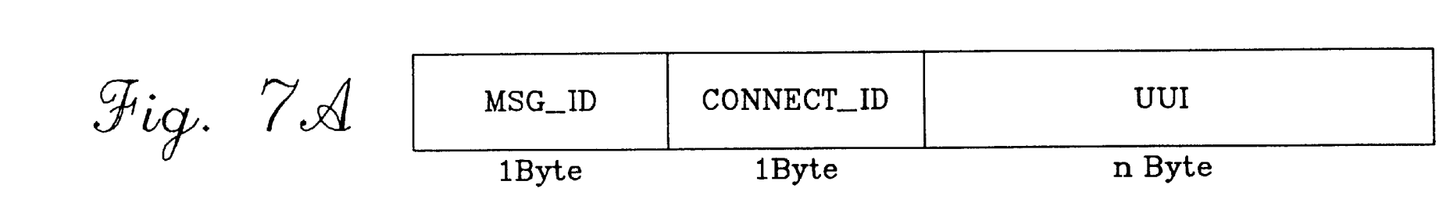
FIGS. 7A and 7B are charts illustrating a structure of alert message (Alert MSG) to be sent to a calling party from a called party when an absent message sending mode is activated according to the principles of the present invention.

Referring to FIG. 7A which illustrates the structure of an alert message, the MSG_ID represents the type of a message, and the CONNECT_ID is a special control number which is to identify the appointed one of several simultaneous callings. The UUI is an information which is sent when there is an information to be sent to the other party by signaling each other between subscribers. FIG. 7B illustrates the structure of an alert message which is transmitted to the public telephone exchange system at step S5 of FIG. 6 when the called-up extension subscriber signaled at step S4 of FIG. 6 is set in the absent message sending mode. When the called-up extension line is set in the absent message sending mode because of the called-up party's outgoing for lunch, for example, the absent message "OUT OF(=>?FOR?) LUNCH" representing the absent reason is loaded on UUI region of the alert message.

Figure 7B:
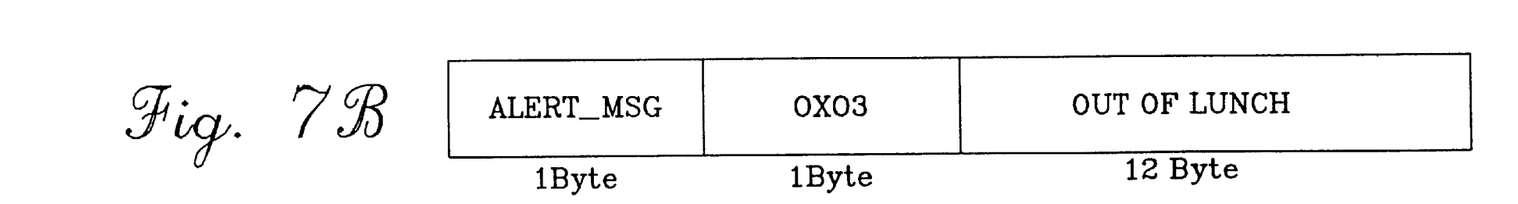

In case (CASE 1) that the called-up extension subscriber rang up at step S4 of FIG. 6 is set in the absent message sending mode, the public telephone exchange system receives an alert message of the structure form as shown in FIG. 7B through D channel of digital line from ISDN exchange system, and thereafter display the absent message contained in the received alert message on LCD screen of the caller's digital telephone at step S6.

In case (CASE 2) that the called-up extension subscriber rang up at step S4 of FIG. 6 is not set in the absent message sending mode, however, when the called subscriber takes the receiver off the hook and responses to calling signal a step S6 of FIG. 6, the ISDN exchange system transmits the connecting message (CONNECT_MSG) representing the called-up extension subscriber's response through D channel of digital trunk line to the public telephone exchange system at step S7. The public exchange system, in turn, transmits the connection acknowledging message (CONNECT_ACK_MSG) representing confirmation of the connecting message through D channel of digital trunk line to the private ISDN exchange system, thereby performing the communicating operation at step S8.

As described above, the would be called-up party can designate in advance a proper absent message corresponding to his absent reason before outgoing, and sets his digital telephone to the absent message sending mode, and thereafter, when the caller connected to the public telephone exchange system calls the would-be called-up party, an absent message representing the called-up party's absent is sent to the caller. Accordingly, the present invention has the advantage that the caller can be advised of the absent reason of the called-up party and of the proper time for calling up again.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for sending absent messages in an ISDN exchange system having digital telephones connected to said ISDN exchange system as extensions, with each digital telephone including a plurality of function keys and an LCD screen, said method comprising the steps of:
   checking whether an extension subscriber telephone is set in an absent message sending mode in response to an incoming call from a caller through said ISDN exchange system; and
   transmitting a stored absent message through a D channel of a digital trunk line to be displayed on the LCD screen of the caller's digital telephone, when the extension subscriber telephone is set in said absent message sending mode.

2. The method of claim 1, further comprised of said ISDN exchange system including a memory for storing a plurality of different absent messages, and said step of sending said absent message including the steps of:
   selectively retrieving one of said plurality of different absent messages stored in said memory; and
   sending said retrieved absent message to be displayed on the LCD screen of said caller's digital telephone.

3. The method of claim 2, wherein said step of sending said absent message further includes detecting whether said caller is one of a private extension subscriber and a public telephone exchange subscriber.

4. The method of claim 3, further transmitting said absent message retrieved from said memory through a specified channel of the public digital trunk line to a digital telephone connected to the public telephone exchange system for display on the LCD screen of said digital telephone when said caller is a public telephone exchange subscriber.

5. The method of claim 4, further transmitting said absent message retrieved from said memory through the D channel of said digital trunk line for display on the LCD screen of the digital telephone connected to said public telephone exchange system only when said caller is a public telephone exchange subscriber.

6. The method of claim 3, further transmitting said absent message retrieved from said memory to said caller's extension line for display on the LCD screen of the digital telephone corresponding to said extension line when said caller is a private extension subscriber.

7. A method for transferring absent messages between a first ISDN exchange system and a second ISDN exchange system, both being connected through respective digital trunk lines to a public telephone exchange system, and to respective digital telephones of a first and second extension each having a plurality of function keys, a LCD screen and a memory for storing a plurality of different absent messages, said method comprising the steps of:
   detecting whether the first extension of said first ISDN exchange system is set to an absent message sending mode when said first extension of said first ISDN exchange system is called up by the second extension of said second ISDN exchange system;
   retrieving a selected one of said plurality of different absent messages stored in a memory of said first ISDN exchange system when said first extension is set to said absent message sending mode;
   transmitting the retrieved absent message from said first ISDN exchange system through said digital trunk line to said public telephone exchange system;
   transmitting said retrieved absent message from said public telephone exchange system through said digital trunk line to said second ISDN exchange system; and
   displaying said retrieved absent message on LCD screen of said second extension's digital telephone, wherein said first ISDN exchange system transmits said retrieved absent message through the D channel of said digital trunk line to said public telephone exchange system to transmit said retrieved absent message through the D channel of said digital trunk line to said second ISDN exchange system.

8. The method of claim 7, wherein said first ISDN exchange system transmits said retrieved absent message through the D channel of said digital trunk line to said public telephone exchange system to transmit said retrieved absent message through the D channel of said digital trunk line to said second ISDN exchange system only when said digital trunk line is detected.

9. A method, comprising:
   detecting when an incoming call is received from a telephone set of a calling party;
   detecting a mode of a telephone set of a called party;
   when said mode of the called party's telephone set corresponds to a message sending mode wherein a message is stored in a memory coupled to the called party's telephone set, detecting an exchange type corresponding to the incoming call, said message indicating that the called party is away from the called party's telephone set;
   when said exchange type corresponds to a public telephone exchange and a trunk line type of said public telephone exchange corresponds to a digital trunk line, retrieving said message from said memory and then transmitting said message through a D channel of said digital trunk line to the calling party's telephone set allowing said message to be displayed on a display panel of the calling party's telephone set; and when said exchange type corresponds to a private extension and the calling party's telephone set corresponds to a digital telephone set, retrieving said message from said memory and then transmitting said message through an extension line to the calling party's telephone set allowing said message to be displayed on a display panel of the calling party's telephone set.

10. The method of claim 9, further comprising:

when said exchange type corresponds to said public telephone exchange and said trunk line type of said public telephone exchange corresponds to an analog trunk line, not retrieving said message from said memory and not transmitting said message to the calling party's telephone set.

11. The method of claim 9, further comprising:

when said exchange type corresponds to said private extension and the calling party's telephone set does not correspond to a digital telephone set, not retrieving said message from said memory and not transmitting said message through an extension line to the calling party's telephone set.

12. The method of claim 9, wherein said display panel of the calling party's telephone set corresponds to a liquid crystal display panel.

13. The method of claim 9, wherein said message is selected from among a do not disturb message, an out to lunch message, an in a meeting message, a gone home message, an on vacation message, and a will return in afternoon message.

14. The method of claim 9, wherein said message is transmitted only through the D channel of said digital trunk line and not through a B channel of said digital trunk line when said exchange type corresponds to a public telephone exchange and said trunk line type of said public telephone exchange corresponds to said digital trunk line.

15. A method, comprising:

when a public telephone exchange subscriber utilizes a public telephone exchange system to call an extension subscriber of an ISDN exchange system, transmitting from the public telephone exchange system a call setup message to the ISDN exchange system, the public telephone exchange subscriber corresponding to a calling party and utilizing a calling party's telephone set, and the extension subscriber of the ISDN exchange system corresponding to a called party and utilizing a called party's telephone set;

when the call setup message is received from the public telephone exchange system, transmitting from the ISDN exchange system a setup acknowledge message to the public telephone exchange system and sending ring signals from the ISDN exchange system to the called party's telephone set;

transmitting an alert message only through a D channel of a digital line from the ISDN exchange system to the calling party's telephone set to advise the calling party that the called party is being signaled; and when a called-party-is-absent message is stored in a memory, said transmitting of said alert message includes said called-party-is-absent message retrieved from said memory, wherein said called-party-is-absent message indicates that the called party is away from the called party's telephone set.

16. The method of claim 15, wherein said called-party-is-absent message is displayed on a display panel of the calling party's telephone set.

17. The method of claim 16, wherein said display panel of the calling party's telephone set corresponds to a liquid crystal display panel.

18. The method of claim 15, wherein said called-party-is-absent message is selected from among a do not disturb message, an out to lunch message, an in a meeting message, a gone home message, an on vacation message, and a will return in afternoon message.

19. The method of claim 16, wherein said display panel of the calling party's telephone set is selected from among a cathode ray tube, a liquid crystal display, a gas-plasma display, a light emitting diode display, an electro-luminescent display, and a field emission display.

20. The method of claim 15, wherein said alert message is transmitted only through said D channel of said digital line and not through a B channel of said digital line from the ISDN exchange system to the calling party's telephone set to advise the calling party that the called party is being signaled.

* * * * *